United States Patent
Namm et al.

(10) Patent No.: US 10,318,139 B1
(45) Date of Patent: Jun. 11, 2019

(54) SYSTEM, METHOD, AND APPARATUS FOR EXTERNAL ACCESSORY KNOB CONTROL USING MOTION TRACKING DETECTION

(71) Applicant: Motorola Solutions, Inc., Chicago, IL (US)

(72) Inventors: Joseph Namm, Plantation, FL (US); Goktug Duman, Oakland Park, FL (US); Jorge L. Garcia, Plantation, FL (US)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 15/946,964

(22) Filed: Apr. 6, 2018

(51) Int. Cl.
*G06F 3/0484* (2013.01)
*G06F 1/16* (2006.01)
*G06F 3/01* (2006.01)

(52) U.S. Cl.
CPC ........ *G06F 3/04847* (2013.01); *G06F 1/1607* (2013.01); *G06F 1/1694* (2013.01); *G06F 3/016* (2013.01); *G06F 2200/1637* (2013.01)

(58) Field of Classification Search
CPC combination set(s) only.
See application file for complete search history.

(56) References Cited

U.S. PATENT DOCUMENTS

| | | | |
|---|---|---|---|
| 3,662,618 A * | 5/1972 | Kroll | G05G 1/10 74/527 |
| 8,442,797 B2 | 5/2013 | Kim et al. | |
| 8,542,189 B2 | 9/2013 | Milne | |
| 9,176,542 B2 | 11/2015 | Milne et al. | |
| 2004/0145613 A1 | 7/2004 | Stavely et al. | |
| 2010/0088061 A1 | 4/2010 | Horodesky et al. | |
| 2010/0302139 A1 | 12/2010 | Luiro et al. | |
| 2015/0084900 A1* | 3/2015 | Hodges | G06F 1/1632 345/173 |
| 2016/0011663 A1* | 1/2016 | Starner | G06F 1/163 340/407.2 |
| 2018/0164903 A1* | 6/2018 | Chu | B60K 37/06 |

FOREIGN PATENT DOCUMENTS

| | | | |
|---|---|---|---|
| WO | 2009/071336 | 6/2009 | ............... G06F 3/01 |
| WO | 2010/042625 | 4/2010 | |

* cited by examiner

*Primary Examiner* — Travis R Hunnings
(74) *Attorney, Agent, or Firm* — Baker Botts L.L.P.

(57) ABSTRACT

A system, method, and apparatus for external accessory knob using a motion tracking device are disclosed. A portable electronic device may include a housing including a processor coupled to a memory and a motion tracking device. The external accessory knob may be mounted to the housing and may comprise a position holding mechanism. The motion tracking device may be operable to detect perturbation in at least one feedback parameter perturbed by movement of the external accessory knob. The movement may overcome opposition by the position holding mechanism. The processor may receive and compare the perturbed feedback parameter to a motion profile defined by data stored in the memory to identify a characteristic of the movement of the external accessory knob by matching the perturbed feedback parameter with at least one portion of the stored data defining the motion profile associated with known perturbations.

18 Claims, 8 Drawing Sheets

SYSTEM, METHOD, AND APPARATUS FOR EXTERNAL ACCESSORY KNOB CONTROL USING MOTION TRACKING DETECTION

BACKGROUND OF THE INVENTION

Many communication devices are used as portable electronic devices, such as cellphones, that utilize different types of input devices of different complexities. The input device may include a touchscreen, such as a resistive touchscreen, capacitive touchscreen, or optical touchscreen, or active digitizer. A resistive touchscreen may detect pressure on the surface of the touchscreen, such as pressure from a fingertip or a tip of a stylus, and register input by locating the position and movement of the detected pressure. A capacitive touchscreen may detect the presence of a conductive element, such as a part of the human body, to register input based on whether the conductive element is near a location on the screen. An optical touchscreen may detect the absence of light between a light source and an optical detector to register input. For example, a human fingertip may block the transmission of light between the light source and optical detector to enable a user to provide input to a communication device. An active digitizer may register input from a stylus by detecting one or more inputs, such as pressure on the surface of the touchscreen and the presence of a conductive element. Communication devices may also include circuitry to detect and process input from the input device.

Present portable electronic devices do not require physical controls but may require visual attention from a user to provide input. However, there are situations in which it may not be feasible for a user to dedicate visual attention to provide input and to confirm whether the input was detected properly. For example, in a situation in which a user is operating another device or machine, such as a vehicle, dedicated visual attention of the user may be at a premium. Moreover, some input devices may not satisfy operational requirements in rugged environments and may need to satisfy one or more environmental tests that raise the cost of the input device.

There exists a limitation with respect to functionality where no mechanisms currently exist for an input device of a portable electronic device to provide input without requiring visual attention from the user and to satisfy the operational requirements in rugged environments. This functionality typically may not be achieved by simply electrically coupling an input device to the portable electronic device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
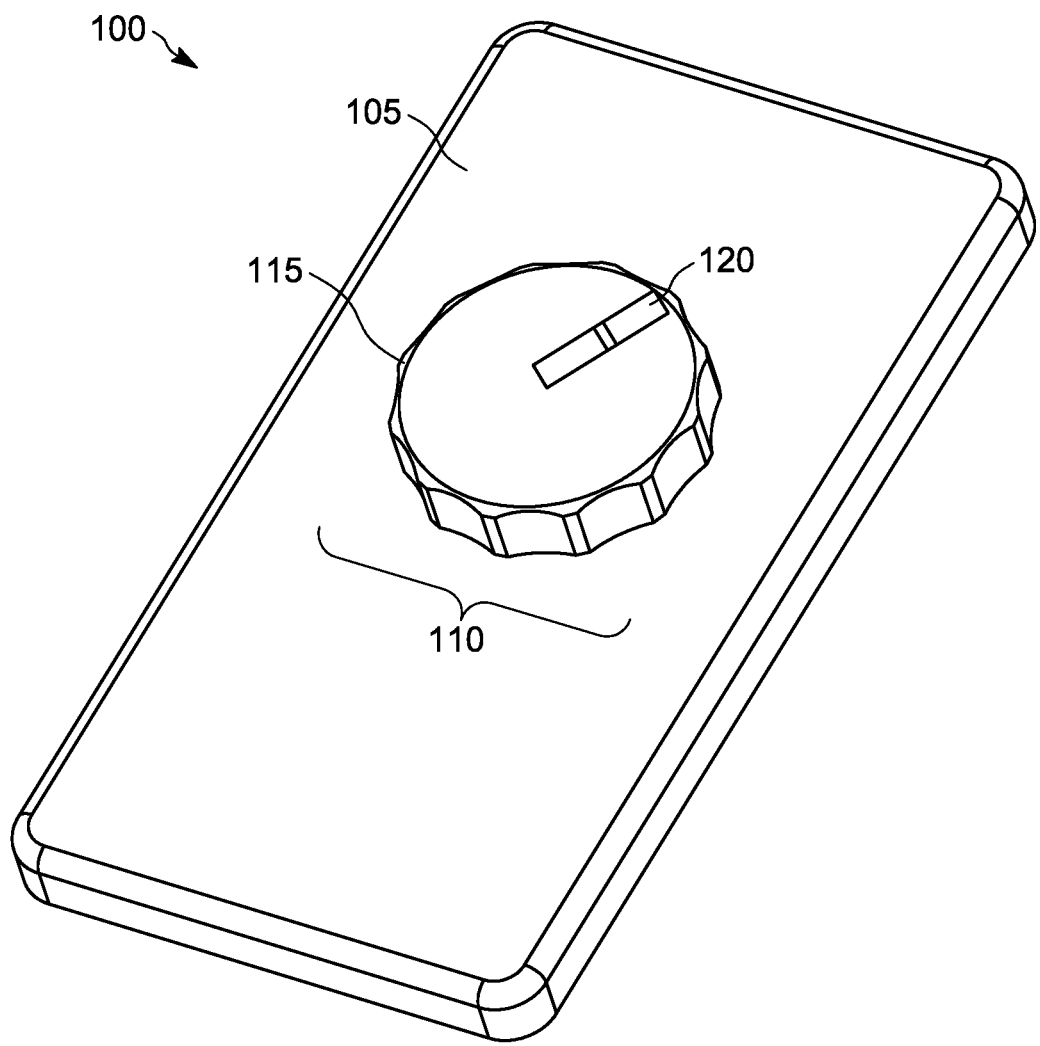
FIG. 1 is an illustration of an example portable electronic device that includes an external accessory knob mounted to a housing, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, and apparatus for an external accessory knob control using motion tracking detection. In one embodiment, a disclosed portable electronic device includes a housing comprising a processor, a memory coupled to the processor, the memory operable to store data defining a motion profile, a motion tracking device coupled to the processor, and an external accessory knob mounted to the housing. The external accessory knob comprises a position holding mechanism operable to oppose motion of the external accessory knob. The motion tracking device is operable to detect perturbation in at least one feedback parameter perturbed by movement of the external accessory knob, the movement to overcome opposition by the position holding mechanism. The processor is operable to receive the perturbed feedback parameter and compare the perturbed feedback parameter to the motion profile to identify a characteristic of the movement of the external accessory knob by matching the perturbed feedback parameter with at least one portion of the stored data defining the motion profile associated with known perturbations.

In one embodiment, a disclosed method of external accessory knob control of a portable electronic device includes detecting perturbation in at least one feedback parameter perturbed by movement of an external accessory knob, comparing the perturbed feedback parameter to at least one portion of a predefined motion profile associated with known perturbations, finding a match between the perturbed feedback parameter and the at least one portion of the predefined motion profile, and identifying a characteristic of the movement of the external accessory knob based on the match. The movement may overcome opposition by a position holding mechanism of the external accessory knob mounted to a housing of the portable electronic device. The perturbation may be detected by a motion tracking device of the portable electronic device.

In one embodiment, a disclosed control interface for a portable electronic device includes an external accessory knob mounted to an exterior surface of the portable electronic device. The external accessory knob may include a position holding mechanism operable to oppose motion of the external accessory knob and produce perturbation by movement of the external accessory knob. The movement of the external accessory knob may overcome the opposition to movement by the position holding mechanism. The external accessory knob is operable to transmit the perturbation to the portable electronic device. The perturbation is operable to be detected by a motion tracking device of the portable electronic device.

In at least some embodiments of the present disclosure, the systems, methods, and apparatus as described herein for an external accessory knob control using motion tracking detection may employ a rotary control for the external accessory knob to overcome opposition by the position holding mechanism by rotation of the rotary control. Unlike systems that employ input devices that require visual attention from the user, the external accessory knob may enable a user to operate the external accessory knob using one or more tactile feedback responses including, but not limited to detents to provide the sensation of a click, indentations on the knob to indicate the relative position of the input device across a range of input, or a hard stop that prohibits movement of the knob beyond a predefined position.

In at least some embodiments of the present disclosure, the external accessory knob described herein may be environmentally sealed from the housing comprising one or more components to process input. Unlike systems that employ input devices that employ electrical or optical coupling between the input device and the portable electronic device, the external accessory knob described herein may use a motion tracking device in the housing to detect perturbations in at least one feedback parameter perturbed by movement of the external accessory knob. The perturbations may be detected independent of any electrical coupling of the motion tracking device and the external accessory knob may be environmentally sealed from the housing to enable operation in rugged environments without the need to satisfy expensive environmental tests that raise the cost of the external accessory knob.

In at least some embodiments of the present disclosure, the external accessory knob described herein may be used to provide input to a portable electronic device that is held by a user or mounted to a device that permits perturbations associated with the external accessory knob. Unlike systems that employ magnetic input to the portable electronic device, the external accessory knob described herein may generate perturbations that provide acceleration and angular velocity on one or more axes to enable input to the portable electronic device independent of any magnetism measured by a magnetometer in the portable electronic device. As such, the perturbations may be detectable and useable without interfering with the magnetism measured by the magnetometer. For example, the magnetism measured by the magnetometer may be independent of the position of the external accessory knob.

In at least some embodiments of the present disclosure, the external accessory knob described herein may be mounted to a surface of the housing while maintaining the ability for a user to hold the portable electronic device. Unlike systems that use push toggles that are embedded in the housing, the external accessory knob does not require additional space in the housing to maintain a thin profile or the ability for a user to hold the portable electronic device by hand or for the portable electronic device to be mounted to a belt of a user. Unlike the toggles that typically require repeated actions by a user of the device, the external accessory knob provides for relatively quick input. Unlike toggles that typically have two states, the external accessory knob may provide a plurality of states with a hard stop to provide a user the ability to change a setting of the portable electronic device across a range, such as adjusting the channel or volume, without the need to dedicate visual attention to the response from the input.

Referring now to FIG. 1, there is provided an illustration of an example portable electronic device 100 that includes an external accessory knob 110 mounted to a housing 105 in accordance with some embodiments. In various embodiments, housing 105 may comprise any suitable enclosure for the portable electronic device including, but not limited to a removable protective case for the portable electronic device, a fixed case of the portable electronic device, and a back panel of the portable electronic device. For example, external accessory knob 110 may be mounted to the surface of an exterior of portable electronic device 100. The exterior of the housing may be made of any suitable material including, but not limited to a glass. metal alloy, plastic, and rubber. External accessory knob 110 may be mounted to the surface of housing 105 in a suitable location to avoid covering other features of portable electronic device 100, such as a camera or biometric authentication device. As will be described herein, external accessory knob 110 may be mounted without the need for an electrical or optical coupling to one or more components in portable electronic device 100. In addition, external accessory knob 110 may be constructed and used so as not to interfere with the magnetism measured by a magnetometer in portable electronic device 100. For example, external accessory knob 100 may be designed with non-magnetic materials or may be shielded to prevent magnetic interference.

External accessory knob 110 is operable to be moved by a user of portable electronic device 100 to provide input, such as to increase or decrease the volume of a speaker associated with portable electronic device 100. In some embodiments, portable electronic device 100 may include an internal speaker or may be coupled to an external speaker by a wired or wireless interface. External accessory knob 110 may include a position holding mechanism configured to slightly oppose movement of external accessory knob 110. In this example, external accessory knob 110 includes a notch 120 to indicate a position of external accessory knob 110. Notch 120 may include one or more indicators, including a visual indicator, such as a dial, and a physical indicator, such as a groove. External accessory knob 110 may include a hard stop to prohibit movement of external accessory knob beyond a predetermined point. External accessory knob 110 may include indentations 115 to assist in gripping and movement by a user. Note that the portable electronic device 100, housing 105, external accessory knob 110, indentations 115, and notch 120 are not drawn to scale. It will be appreciated that external accessory knob 110, indentations 115, and notch 120 are depicted for illustrative purposes only and that portable electronic device 100 may be implemented using any other type of suitable protuberance with a position holding mechanism that is operable to be mounted to an exterior surface associated with the portable electronic device, as described herein. For example, in various embodiments, external accessory knob 110 may be implemented using a rotary control, a slider, or knurled roller.

In various embodiments, the position holding mechanism may be implemented using a plurality of detents and one or more mechanical devices to store energy, such as a spring or swing. The plurality of detents may slightly oppose movement of external accessory knob 110 by storing energy in mechanical devices. For example, each detent may be located at a fixed radial position around external accessory knob 110 and a spring may store energy while movement of external accessory knob 110 is opposed. It will be appreciated that other position holding mechanisms may be implemented, as described herein.

Figure 2:
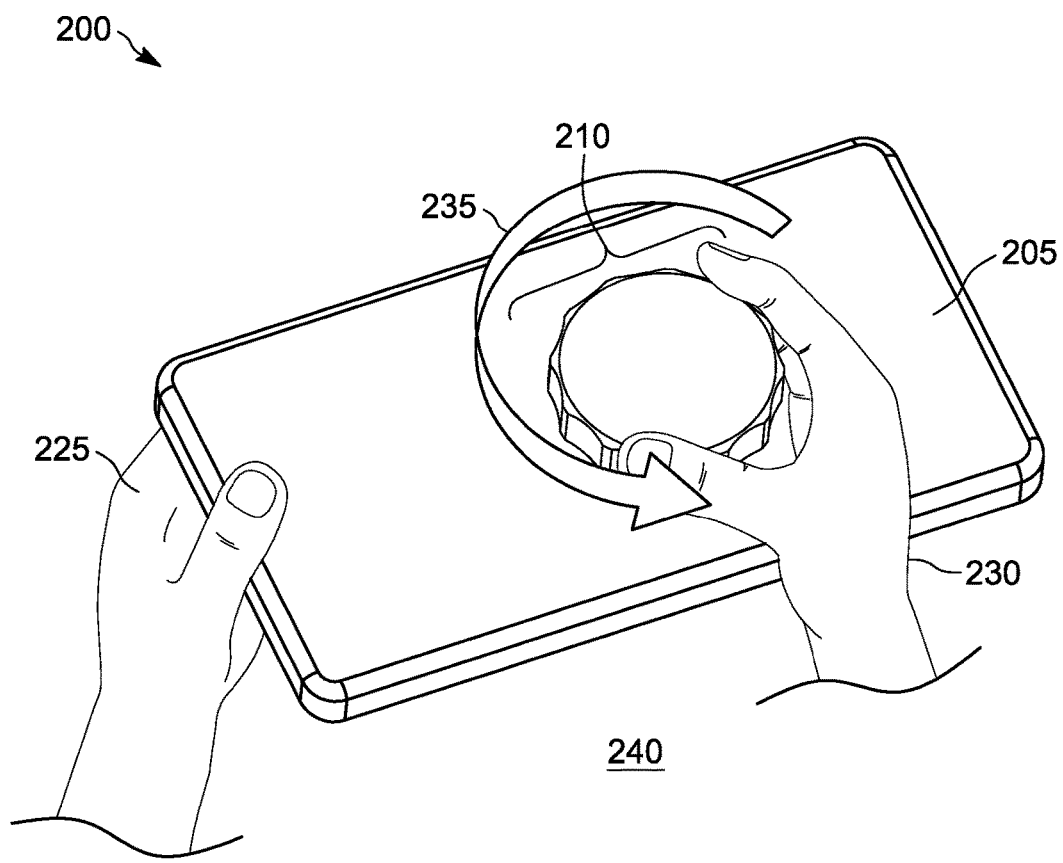
FIG. 2 is a system diagram illustrating a user holding a handheld portable electronic device and operating an external accessory knob, in accordance with some embodiments.

Referring now to FIG. 2, there is provided a system diagram of a user 240 holding a handheld portable electronic device 200 and operating an external accessory knob 210 in accordance with some embodiments. In FIG. 2, user 240 is depicted with two hands (225 and 230). In this example, one hand 225 holds the portable electronic device 200 and another hand 230 operates external accessory knob 210. In some embodiments, handheld portable electronic device 200 may be affixed to a mount, such a belt of a user. The mount may be associated with a device that permits perturbations in parameters based on the mass and rigidity of the device. For example, if the handheld portable electronic device 200 is hard-mounted to a table, the table may inhibit perturbations in parameters based on the mass or rigidity of the table. External accessory knob 210 may be mounted to housing 205 of handheld portable electronic device 200. Hand 230 may provide input to handheld portable electronic device 200 by moving the external accessory knob 210 in the direction and manner of movement 235. In FIG. 2, movement 235 is shown as a counterclockwise rotation. It will be appreciated that other movements may be used to provide input including, but not limited to sliding external accessory knob 210 in a particular direction, forward rotation of external accessory knob 210, backward rotation of external accessory knob 210, and clockwise rotation of external accessory knob 210. When hand 230 attempts to provide input by moving external accessory knob 210, a position holding device in external accessory knob 210 slightly opposes movement until the force applied by hand 230 overcomes the opposition. Upon overcoming the opposition, external accessory knob 210 moves relative to housing 205 of handheld portable electronic device 200. Hand 225 may provide an opposite force to counter movement 235 of external accessory knob 210. The opposite force may result in motion of handheld portable electronic device 200 prior to the movement of external accessory knob 210. The motion resulting from the opposite force may be detected as one or more parameters including, but not limited to linear acceleration and rotational acceleration. In some embodiments, the motion resulting from the opposite force may be stored in a portion of the data representing perturbations detected by the motion tracking device, as described for FIG. 3.

Figure 3:
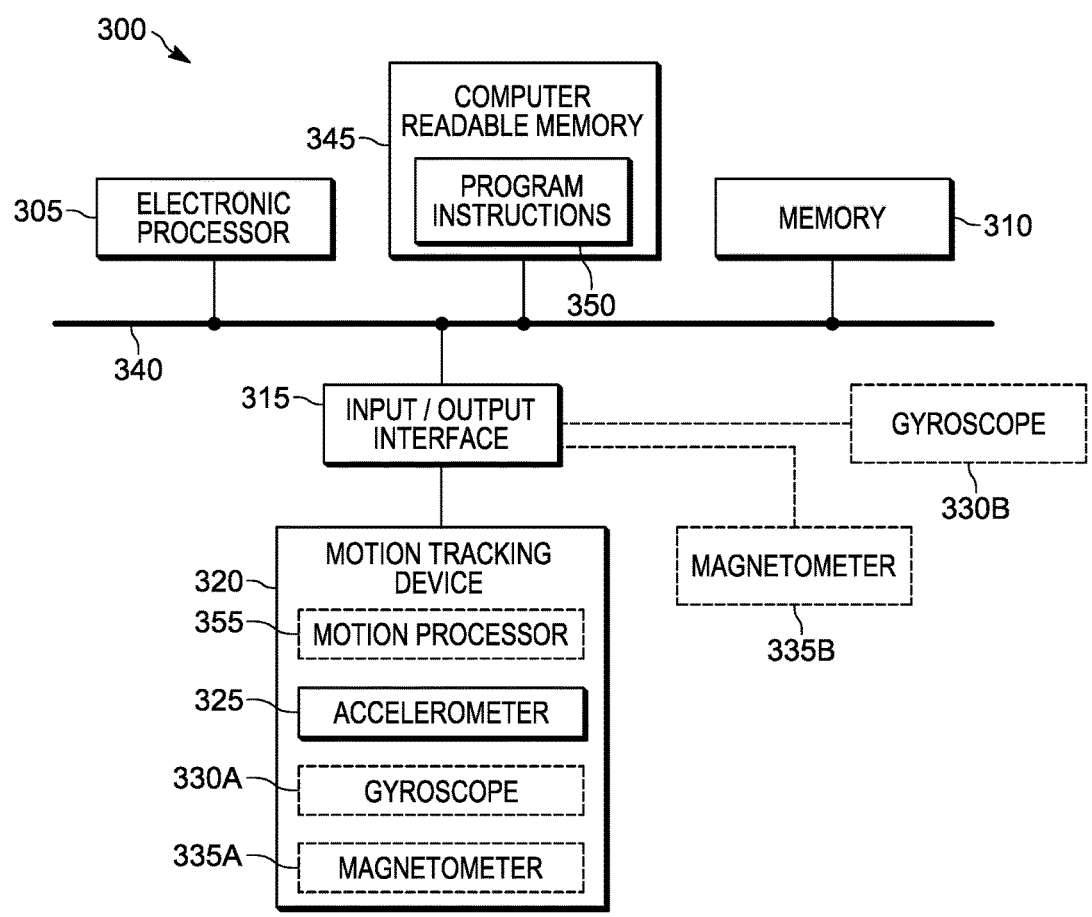
FIG. 3 is a block diagram illustrating an example portable electronic device for motion tracking, in accordance with some embodiments.

As described herein, a portable electronic device may include an electronic processor that detects and processes motion tracking information. Referring now to FIG. 3, there is provided a block diagram illustrating an example portable electronic device 300 for motion tracking in accordance with some embodiments. In some embodiments, portable electronic device 300 may be configured to perform the functions of processing motion tracking information. As illustrated in this example embodiment, portable electronic device 300 may include an electronic processor 305, memory 310, computer-readable medium 345, and input/output interface 315, all of which may be coupled to a system bus 340 through which they communicate with each other. In various embodiments, electronic processor 305 may include a microprocessor, a microcontroller, a system-on-a-chip, a field-programmable gate array, a programmable mixed-signal array, or, in general, any system or sub-system that includes nominal memory and that is capable of executing a sequence of instructions to control hardware. In various embodiments, memory 310 may include random access memory (RAM), static random access memory (SRAM), and dynamic random access memory (DRAM).

In one example embodiment, computer-readable medium 345 may store program instructions 350, at least some of which may be executed by electronic processor 305 to perform one or more operations described herein. For example, one or more operations of method 600 illustrated in FIG. 6 or method 700 illustrated in FIG. 7 may be performed by program instructions 350 executing on electronic processor 305. In various embodiments, computer-readable medium 345 may be implemented with a non-volatile memory (NVM). For example, computer-readable memory 345 may include a magnetic storage device, an optical storage device, a solid-state storage device, a programmable read only memory (PROM), an erasable programmable read only memory (EPROM), an electrically erasable programmable read only memory (EEPROM), a flash memory, or, in general, any device or memory that is capable of storing a sequence of instructions to control hardware. In some embodiments, program instructions 350 may include program instructions that when executed by electronic processor 305 implement other functionality features of portable electronic device 300 or motion tracking device 320.

In some embodiments, memory 310 may store data representing perturbations detected by the motion tracking device, such as one or more feedback parameters or a motion profile. In some embodiments, memory 310 may also store data used in performing other functions of the electronic processor 305 or a device communicatively coupled to electronic processor 305. In this example embodiment, input/output interface 315 may include interfaces through which electronic processor 305 may be coupled to other elements of portable electronic device 300. For example, electronic processor 305 or memory 310 may be coupled to motion tracking device 320, or one or more portions thereof, as described herein, over input/output interface 715. In addition, electronic processor 305 may be coupled to input/output devices that implement other functionality features of motion tracking device 320, or one or more portions thereof, such as gyroscope 330B or magnetometer 335B.

In some embodiments, motion tracking device 320 may include one or more devices for inertial tracking or magnetic tracking, such as accelerometer 325, gyroscope 330A, or magnetometer 335A. For example, motion tracking device 320 may include an integrated circuit to provide a total of six-axis of measurement. In this example, the integrated circuit may include accelerometer 325, which may provide three-axis of measurement, and gyroscope 330A, which may provide three-axis of measurement. Accelerometer 325 may measure linear acceleration on one or more axes, such as the X-, Y-, and Z-axis. In various embodiments, accelerometer 325 may be implemented using micro-electro-mechanical systems (MEMS) and may include one or more analog-to-digital converters (ADCs) to provide digital responses. In some embodiments, motion tracking device 320 may include a motion processor 355 to provide adjustment of accelerometer 325. For example, motion processor 355 may adjust accelerometer 325 to measure acceleration values across a predefined range, which may be defined as a multiple of the acceleration associated with gravity. Motion processor 355 may also adjust the measurements provided by accelerometer 325. For example, when portable electronic device 300 is placed on a level surface, accelerometer 325 may measure positive one g-force on the Z-axis and zero g-force on the X- and Y-axes. As another example, accelerometer 325 may be used to measure zero g-force on each axis when placed on a level surface and motion processor 355 may be configured to exclude the acceleration associated with gravity.

Gyroscope 330A may measure angular velocity on one or more axes, such as the X-, Y-, and Z-axis. In various embodiments, gyroscope 330A may be implemented using micro-electro-mechanical systems (MEMS) and may include one or more analog-to-digital converters (ADCs) to provide digital responses. In some embodiments, the gyroscope 330B may be implemented external to motion tracking device 320 and may be coupled to communicate with input/output interface 315 or system bus 340. In some embodiments, motion tracking device 320 may include a motion processor 355 to provide angular information about portable electronic device 300, such as the orientation and rotation of portable electronic device 300. Motion processor 355 may also combine information from accelerometer 325 and the gyroscope (330A or 330B) to provide direction or motion information, such as a counter for steps taken by a user.

Magnetometer 335A may measure magnetism on one or more axes, such as the X-, Y-, and Z-axis. In various embodiments, magnetometer 335A may be implemented using Hall effect sensors and may include one or more analog-to-digital converters (ADCs) to provide digital responses. In some embodiments, magnetometer 335B may be implemented external to motion tracking device 320 and may be coupled to communicate with input/output interface 315 or system bus 340. In some embodiments, motion tracking device 320 may include a motion processor 355 to provide magnetic information about a portable electronic device 300, such as a compass. Motion processor may also combine information from accelerometer 325, the gyroscope (330A or 330B), and the magnetometer (335A or 335B) to provide motion information based on geographic cardinal direction, such as the velocity of a user along a path. For example, the magnetometer (335A or 335B) may provide motion information associated with small-counter rotations of portable electronic device 300 relative to movement of the external accessory knob if portable electronic device 300 is handheld. In this example, the small-counter rotations of portable electronic device 300 may represent movement relative to compass true north. In some embodiments, the motion information associated with small-counter rotations may be stored in a portion of the data representing perturbations detected by the motion tracking device.

It will be appreciated that, in some embodiments, functionality provided by motion processor 355 may be integrated into electronic processor 305. In some other embodiments, functionality provided by electronic processor 305, such as motion processing or filtering, may be offloaded to motion processor 355. For example, motion processor 355 may include additional storage to support motion processing including, but not limited to buffers, registers, and random access memory (RAM). In this example, motion processor 355 may execute program instructions to perform motion processing.

Figure 4:
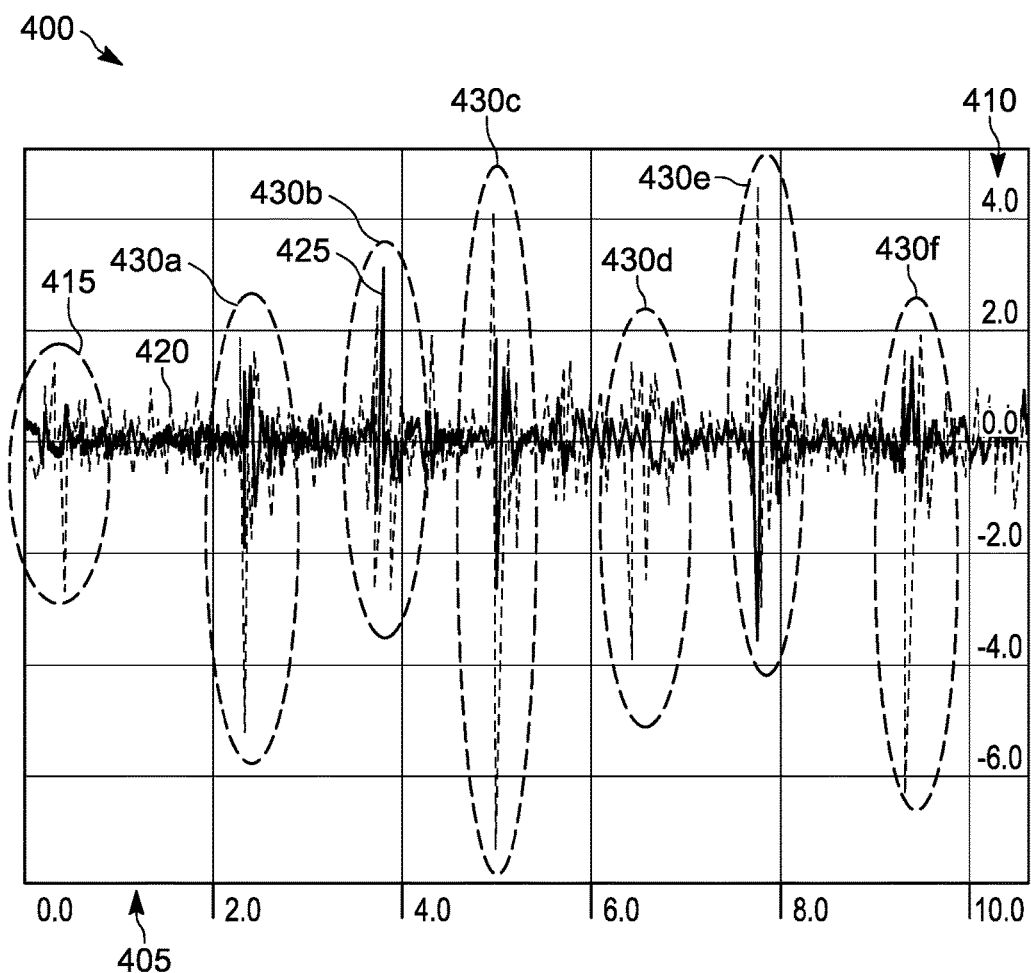
FIG. 4 is a chart illustrating example perturbations in parameters as detected by a motion tracking device, in accordance with some embodiments.

Referring now to FIG. 4, there is provided a chart illustrating example perturbations in parameters as detected by a motion tracking device in accordance with some embodiments. The example perturbations may be used to create a motion profile that is defined by data stored on the portable electronic device. In the illustrated example, the portable electronic device may be placed on a level surface and configured to exclude the acceleration associated with gravity. It will be appreciated that the portable electronic device may be held by the hand of a user or affixed to a mount that permits perturbations in parameters, such as a belt of the user. In the chart 400 illustrated in FIG. 4, the horizontal axis 405 represents the number of seconds elapsed and the vertical axis 410 represents the linear acceleration in reference to the acceleration associated with gravity. Chart 400 shows linear acceleration on the X-axis 420 of the portable electronic device and linear acceleration for the Y-axis 425 of the portable electronic device. Although two axes for linear acceleration are shown, any suitable type of perturbation may be detected on any number of axes, including, but not limited to linear acceleration on the Z-axis and angular velocity around one or more axes. It will be appreciated that acceleration on the X-, Y-, and Z-axes may be converted to a vector acceleration, which may include angles relative to each axis. The converted vector acceleration may be used to identify perturbations independent of the orientation of the portable electronic device.

In the illustrated example, one or more perturbations may be detected and associated with movement of an external accessory knob mounted to a housing of the portable electronic device. For example, perturbations 430a-430f represent movements by an external accessory knob that overcome opposition to motion by a position holding mechanism. In various embodiments, perturbations 430a-430f may be associated with a motion profile that is stored on the portable electronic device. Perturbation 430a may include a linear acceleration on the X-axis greater than four times the g-force in the negative direction and a linear acceleration on the Y-axis greater than one and a half times the g-force in the negative direction. Perturbation 430b may include a linear acceleration on the X-axis greater than two times the g-force in both the position and negative direction and a linear acceleration on the Y-axis greater than three times the g-force in the position direction. Perturbation 430c may include a linear acceleration on the X-axis greater than four times the g-force in both directions and a linear acceleration on the Y-axis greater than two times the g-force in the negative direction. Perturbation 430d may include a linear acceleration on the X-axis greater than two times the g-force in the negative direction and a linear acceleration on the Y-axis greater than the g-force in both directions. Perturbation 430e may include a linear acceleration on the X-axis greater than three times the g-force in both directions and a linear acceleration on the Y-axis greater than three times the g-force in the negative direction. Perturbation 430f may include a linear acceleration on the X-axis greater than six times the g-force in the negative direction and a linear acceleration on the Y-axis greater than the g-force in both directions.

In the illustrated example, one or more perturbations that are not associated with movement of the external accessory knob may also be detected. For example, perturbation 415 may include a linear acceleration on the X-axis greater than two times the g-force in the negative direction, but a linear acceleration on the Y-axis less than the g-force in either direction. Accordingly, perturbation 415 may represent the force of the hand of a user on portable electronic device, such as the forced applied by a user prior to movement of the external accessory knob. In some embodiments, perturbations not associated with movement of the external accessory knob may be stored in a motion profile to indicate known perturbations resulting from movement not associated with the external accessory knob.

Figure 5A:
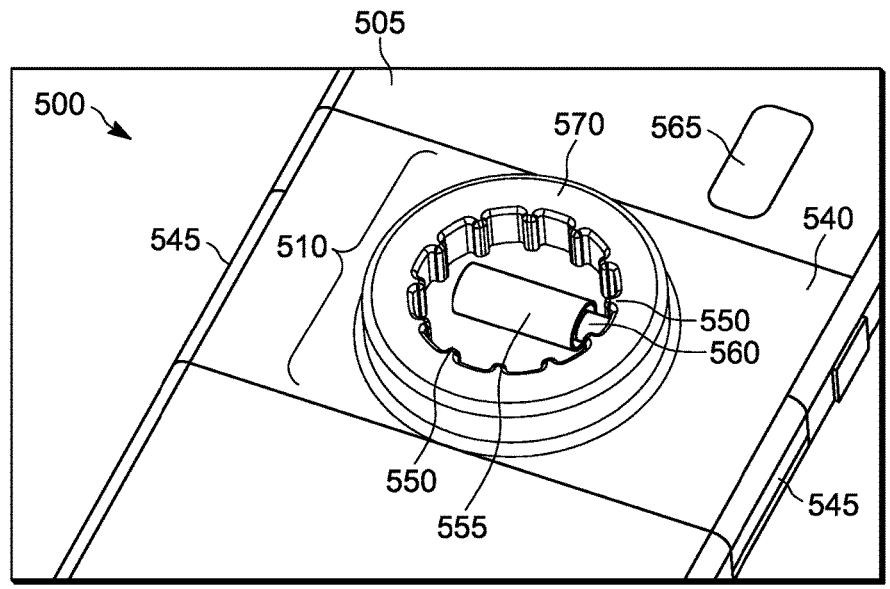
FIG. 5A is an illustration of an external accessory knob mounted to an exterior surface of a portable electronic device, in accordance with some embodiments.

Referring now to FIG. 5A, there is provided an illustration of an external accessory knob mounted to an exterior surface of a portable electronic device is shown in accordance with some embodiments. Portable electronic device 500 may include a surface 505 to which the external accessory knob 510 is mounted. External accessory knob 510 may be mounted in various exterior locations on surface 505 of the portable electronic device, such as below camera 565 of the portable electronic device. It will be appreciated that other exterior locations on surface 505 may be used to mount external accessory knob 510, including but not limited to other orientations of external accessory knob 510 and a surface of a housing for the portable electronic device. In various embodiments, external accessory knob 510 may include one or more components, such as main mounting surface 540, mounting clips 545, detents 550, energy storage device (555 and 560), and base 570. Note that external accessory knob 510, including components thereof, are not drawn to scale. In the illustrated example, main mounting surface 540 may be parallel to surface 505.

In some embodiments, main mounting surface 540 may transfer vibrations to the portable electronic device as perturbations that may be detected in response to movement associated with external accessory knob 510. Main mounting surface 540 may include one or more mounting clips 545 to mount external accessory knob 510 to portable electronic device 500. In the illustrated example, main mounting surface 540 of external accessory knob 510 may include base 570 that includes a plurality of detents 550. Detents 550 may slightly oppose movement of a cover (not shown) for external accessory knob 510 and may provide a position holding mechanism using energy storage device (555 and 560). For example, the energy storage device may include a ball 560 coupled to a spring cylinder 555. It will be appreciated that the energy storage device may include a spring cylinder 555 coupled to other suitable devices, such as a bullet. The ball 560 may be forced against one or more detents 550 to slightly oppose movement by storing energy in spring cylinder 555.

In some embodiments, one or more detents 550 may include a ramp to increase acceleration of a mass, such as a mass associated with the energy storage device (555 and 560), to generate perturbations as the external accessory knob is moved. The magnitude of the perturbations may be amplified by increasing the slope of the ramp to increase the acceleration of the mass. In some embodiments, the amount of mass used to generate perturbations may be increased to amplify the perturbations when vibrations associated the acceleration of the mass are transmitted from the mounted external accessory knob to the motion tracking device in the portable electronic device. It will be appreciated that the external accessory knob may slightly oppose motion with other types of position holding mechanisms, such as a swing or a cantilever spring held in position by a latch. In some embodiments, surface 505 may be the outer surface of a case to protect portable electronic device 500. The case may include one or more cutouts for features of portable electronic device 500, such as cutouts for a camera 565 and main mounting surface 540.

Figure 5B:
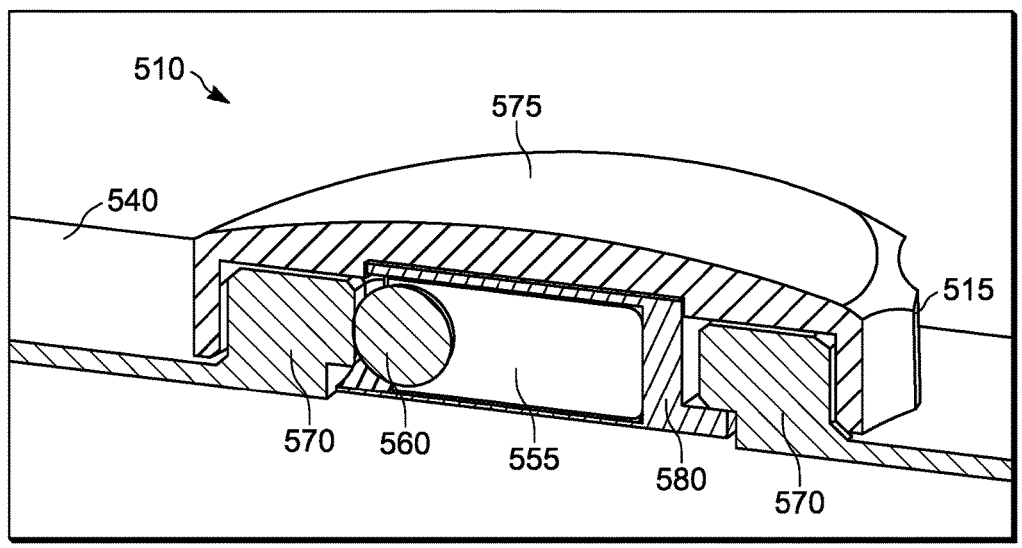
FIG. 5B is a cross sectional view of an external accessory knob, in accordance with some embodiments.

Referring now to FIG. 5B, there is provided a cross sectional view of an external accessory knob in accordance with some embodiments. In the illustrated example, external accessory knob 510 includes a cover 575 mounted to an insert 580 that houses an energy storage device (555 and 560). Note that external accessory knob 510, cover 575, insert 580, energy storage device (555 and 560) are not drawn to scale. In some embodiments, the energy storage device may include a spring cylinder 555 and a ball 560. Cover 575 may include one or more indentations 515 to assist with applying force to move cover 575. As a user of external accessory knob 510 increases the force applied on cover 575, cover 575 may move when the position holding mechanism that slightly opposes movement is overcome. It will be appreciated that insert 580 may house other position holding mechanisms such as a ratchet or a latch for a swing or a cantilever spring.

In some embodiments, the mass of one or more components of external accessory knob 510 may be increased to amplify the acceleration caused by movement of external accessory knob 510. For example, the mass of cover 575 or energy storage device (555 and 560) may be increased to generate more acceleration in response to movement of the external accessory knob 510. In some embodiments, the amount of energy stored in energy storage device (555 and 560) may be amplified by increasing the spring constant associated with the energy storage device. In some embodiments, external accessory knob 510 may also include a main mounting surface 540 with a base 570. As illustrated in FIG. 5B, base 570 may provide support for cover 575 and insert 580, which may be mounted between portions of base 570.

Figure 5C:
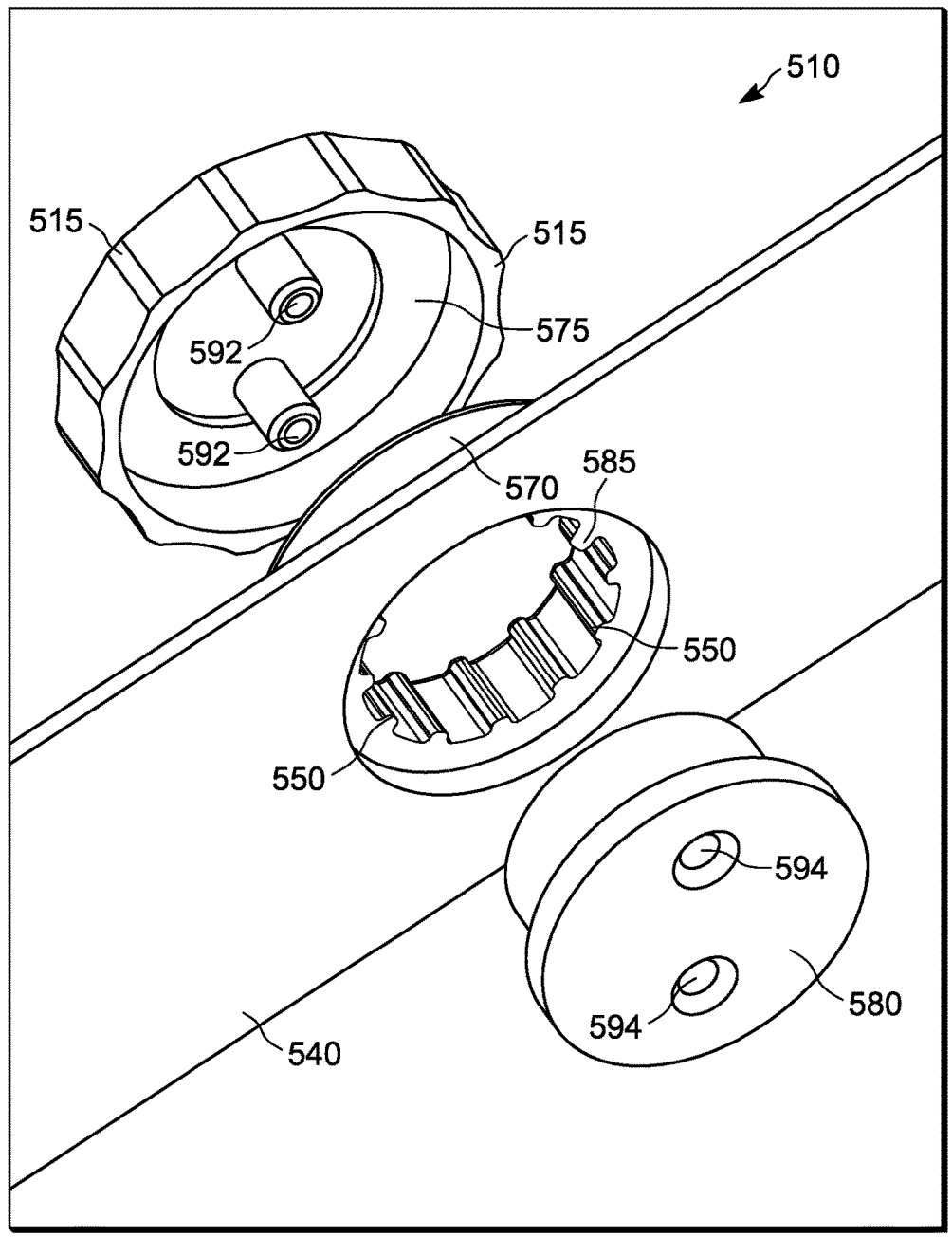
FIG. 5C is an exploded view of an external accessory knob, in accordance with some embodiments.

Referring now to FIG. 5C, there is provided an exploded view of an external accessory knob in accordance with some embodiments. External accessory knob 510 may include a cover 575, main mounting surface 540, insert 580, and hard stop 585, which are not drawn to scale. Insert 580 may include one or more fastening points 594 through which a fastener, such as a screw, may be placed. Cover 575 may be mounted to insert 580 via one or more termination points 592 in which the fastener may be terminated. When a user applies force sufficient to overcome the slight opposition by the position holding mechanism of the external accessory knob 510, insert 580 may move with cover 575 once insert 580 and cover 575 are fastened together. In some embodiments, the main mounting surface 540 may be placed between cover 575 and insert 580. The main mounting surface may include a base 570, which may include a plurality of detents 550 and a hard stop 585. Detents 550 may operate as a position holding mechanism when coupled to the energy storage device mounted to insert 580. Hard stop 585 may restrict movement of the external accessory knob 510 by halting movement past the location of the hard stop.

While several example systems are described herein that include particular types of external accessory knobs having particular position holding mechanisms, such as a rotary control having a ball detent or a slide control with a swing, the techniques described herein may, more generally, be employed in systems in which the external accessory knob has a variety of control types, including but not limited to a rotary control having a ratchet and a rotary or slide control having a cantilever spring.

Figure 6:
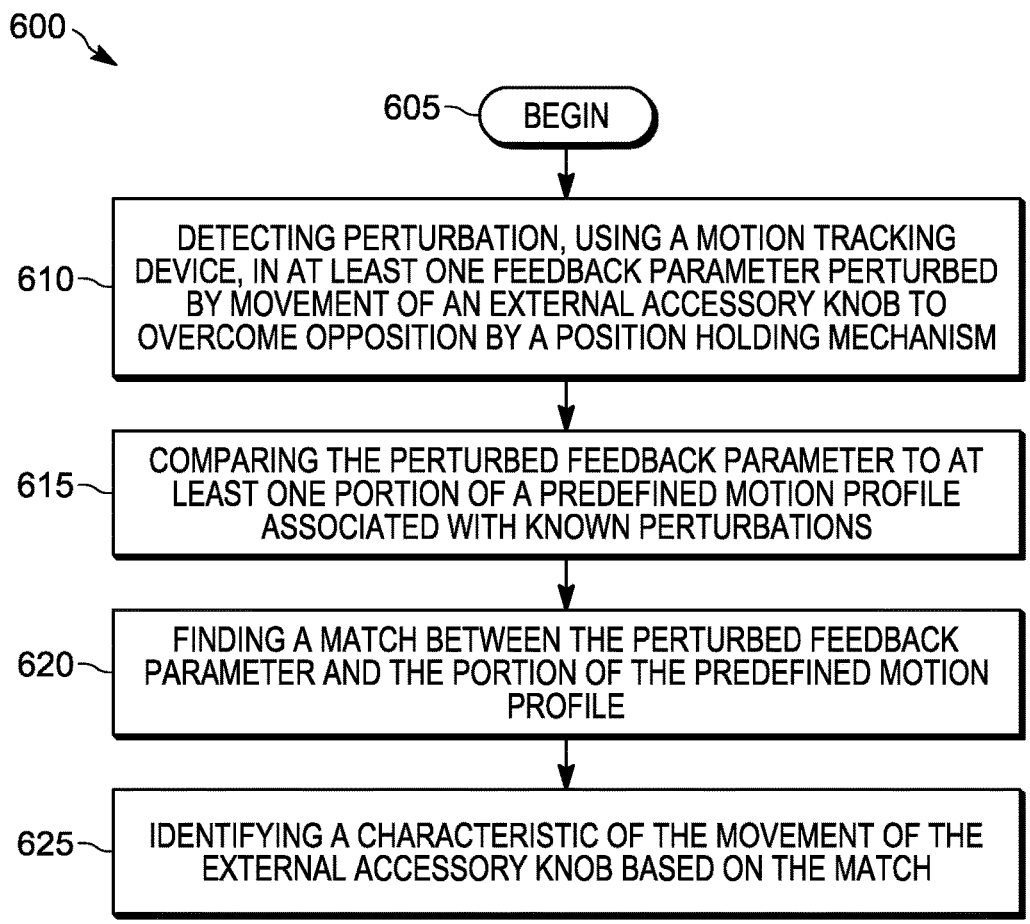
FIG. 6 is a flowchart illustrating a method of motion identification using an external accessory knob, in accordance with some embodiments.

Referring now to FIG. 6, there is provided a flow diagram of an example method 600 for motion identification using an external accessory knob in accordance with some embodiments. While a particular order of operations is indicated in FIG. 6 for illustrative purposes, the timing and ordering of such operations may vary where appropriate without negating the purpose and advantages of the examples set forth in detail throughout the remainder of this disclosure. In various embodiments, a processor in a portable electronic device, such as electronic processor 305 or motion processor 355 in portable electronic device 300 as described for FIG. 3, may execute one or more portions of method 600 following a power-on or reset event. In some embodiments, one or more portions of method 600 may be executed at some predetermined periodic time period thereafter, in response to a trigger raised locally in the portable electronic device. For example, the trigger may be raised in response to movement of an external accessory knob that overcomes opposition by a position holding mechanism.

In this example embodiment, method 600 begins with block 605 in FIG. 6 and continues with block 610, where a motion tracking device is used to detect perturbation in at least one feedback parameter perturbed by movement of an external accessory knob. The movement may overcome the slight opposition to motion by a position holding mechanism, such as the position holding mechanism described for FIGS. 5A-5C. The motion tracking device may include an accelerometer to measure linear acceleration on one or more axes and a gyroscope to measure angular velocity on one or more axes, as described for FIG. 3. For example, the accelerometer may be used to provide at least one perturbed feedback parameter, such as a directional acceleration feedback parameter or a vector acceleration feedback parameter.

In this example, at block 615, the at least one perturbed feedback parameter may be compared to at least one portion of a predefined motion profile. The predefined motion profile may be defined by data stored in a memory coupled to an electronic processor of the portable electronic device, as described in FIG. 3. The predefined motion profile may be associated with known perturbations. In some embodiments, the predefined motion profile may be developed by known perturbations exemplary of movement associated with the external accessory knob or other operation of the portable electronic device. For example, perturbations 430a-430f in FIG. 4 may represent movement associated with the external accessory knob and perturbation 415 in FIG. 4 may represent other operation of the portable electronic device, such as a user moving the portable electronic device. In some embodiments, the predefined motion profile may be generated by the performance of a learning sequence by a user of the portable electronic device. The predefined motion profile may include a list of known perturbations associated with the user, in which each entry in the list includes the type of the known perturbation and one or more parameters associated with the perturbation including, but not limited to a linear direction, vector direction, acceleration vector, angular velocity direction, and angular velocity vector. It will be appreciated that a list of known perturbations may be associated with each user of the portable electronic device. For example, each user of the portable electronic device may hold the portable electronic device with a unique amount of force that is different from the amount of force applied by other users. In some embodiments, the portable electronic device may detect whether the user is holding the portable electronic device by hand or whether the device is affixed to a mount, such as a belt of the user. The detection may be based on the magnetism measured by a magnetometer in the portable electronic device.

In some embodiments, the comparison may be performed by the electronic processor of the portable electronic device, as described in FIG. 3. The electronic processor may receive the at least one perturbed feedback parameter from the motion tracking device. It will be appreciated that the motion tracking device may include a motion processor, such as motion processor 355 in FIG. 4, to perform the comparison and to provide information from the comparison to the electronic processor. For example, the motion processor of the motion tracking device may provide one or more acceleration vectors and may raise an interrupt in the electronic processor of the portable electronic device. In various embodiments, the acceleration vectors may be provided in any suitable manner including, but not limited to, writing data associated with the acceleration vectors to a memory associated with the electronic processor and writing data associated with the acceleration vectors to memory associated with the motion processor. The electronic processor may handle the interrupt by reading one or more acceleration vectors associated with the movement, which may be provided by the motion processor.

At block 620, a match between the at least one perturbed feedback parameter and the portion of the predefined motion profile may be found. For example, a match may be found when the acceleration measured on one or more axes matches a known acceleration associated with a known perturbation of the external accessory knob, as stored in a portion of the data defining the motion profile. In some embodiments, a match may be found when accelerations measured on a plurality of axes matches known accelerations, such as the accelerations associated with one or more perturbations 430a-430f, as shown in FIG. 4. In this example, acceleration that corresponds to a known acceleration on only one axis may be associated with other movements of the portable electronic device, such as a user moving the portable electronic device, and may fail to provide a match.

At block 625, a characteristic of the movement of the external accessory knob may be identified based on the match found in block 620. In some embodiments, the identified characteristic may be associated with movement of the external accessory knob in a particular direction. For example, the identified characteristic may be a rotational direction of the movement associated with a filtered vector direction. The filtered vector direction may be determined by filtering the linear direction from the vector direction provided by the motion tracking device. The identified characteristic may be used to provide input to the portable electronic device, such as input to change a setting of the portable electronic device.

Figure 7:
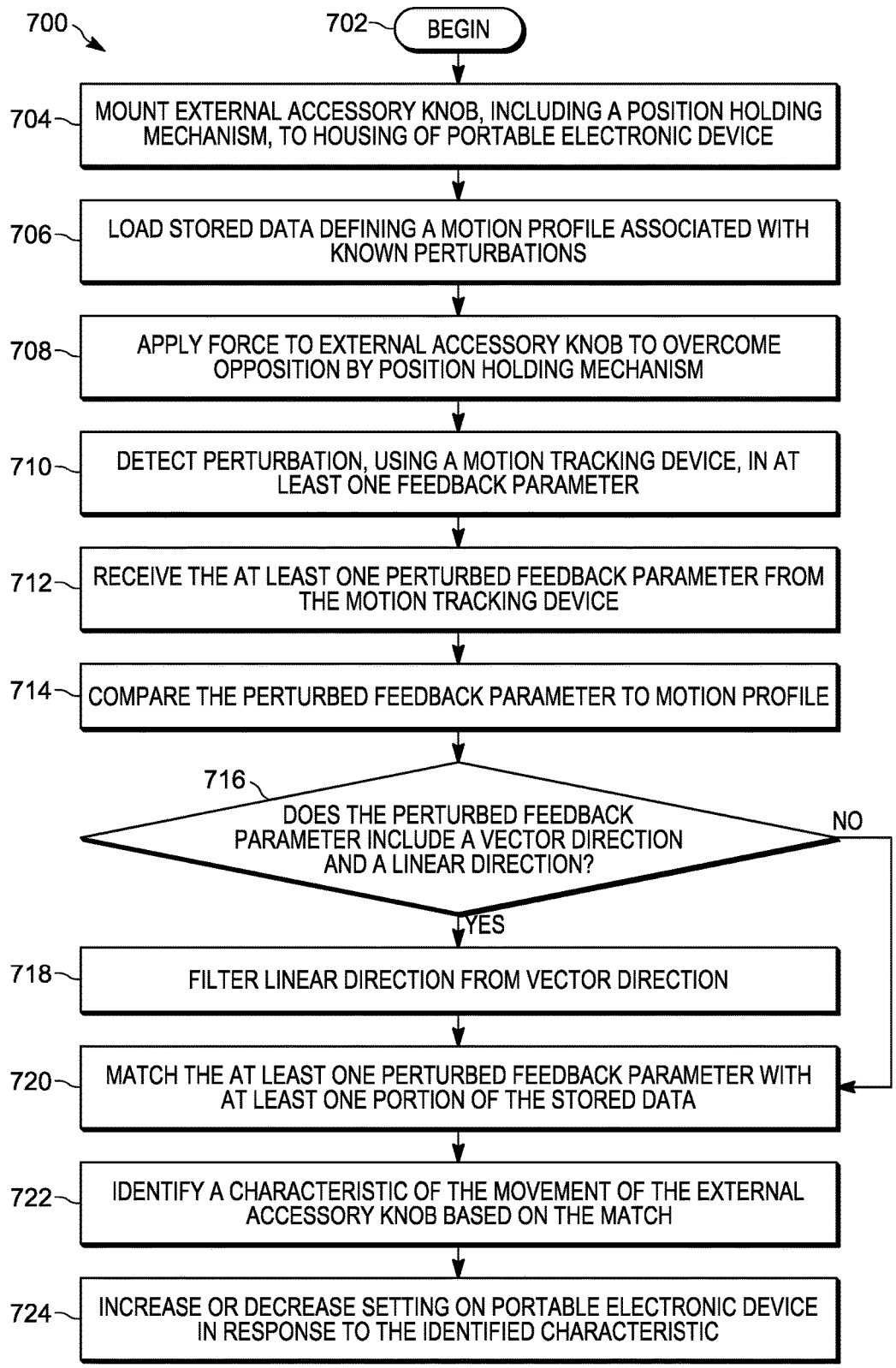
FIG. 7 is a flowchart illustrating a method of external accessory knob control of a portable electronic device using motion tracking, in accordance with some embodiments.

Referring now to FIG. 7, there is provided a flow diagram of an example method 700 for external accessory knob control of a portable electronic device using motion tracking in accordance with some embodiments. While a particular order of operations is indicated in FIG. 7 for illustrative purposes, the timing and ordering of such operations may vary where appropriate without negating the purpose and advantages of the examples set forth in detail throughout the remainder of this disclosure.

In this example embodiment, method 700 begins with block 702 in FIG. 7 and continues with block 704, where an external accessory knob including a position holding mechanism may be mounted to a housing of the portable electronic device. In some embodiments, the housing may be a case of the portable electronic device that is removeable from the portable electronic device. For example, the position holding mechanism may be mounted to an exterior surface of the housing of the portable electronic device. The mounting may mechanically couple the external accessory knob to the portable electronic device without the need for an electrical or optical connection between the external accessory knob and the portable electronic device. Moreover, the external accessory knob may be environmentally sealed against various extreme conditions, such as extreme temperatures, water, and extreme pressure. Mounting the external accessory knob to the housing may permit the external accessory knob to transmit perturbations, such as vibrations, to a motion tracking device contained within the housing of the portable electronic device.

At block 706, stored data defining a motion profile associated with known perturbations may be loaded by a processor. The processor may be an electronic processor of the portable electronic device or a motion processor of the motion tracking device, as shown in FIG. 3. The data may be stored in a non-volatile memory as described for FIG. 3 and may be loaded into memory by the processor. In various embodiments, the motion profile may represent perturbations associated with movements, such as the movement associated with the external accessory knob or movement associated with the portable electronic device. In some embodiments, the data defining the motion profile may include a list of known perturbations in which each entry in the list includes the type of the known perturbation and one or more parameters associated with the perturbation including, but not limited to a linear direction, vector direction, acceleration vector, angular velocity direction, and angular velocity vector. For example, the type of known perturbation may include one or more categories including, but not limited to, the type of use of the portable electronic device, such as handheld use or use of a device mounted to a belt of a user, and whether the perturbation is associated with movement of the external accessory knob or another type of movement of the portable electronic device. In some embodiments, the motion profile may be associated with known perturbations as described for block 615 of FIG. 6. It will be appreciated that the motion profile may comprise a plurality of predefined motion profiles, such as a predefined motion profile per user or per type of use of the portable electronic device, in which the motion profile loaded by the processor changes based on whether the processor detects a particular user or a particular type of use of the portable electronic device.

At block 708, a force may be applied to external accessory knob to overcome opposition by a position holding mechanism of the external accessory knob. In some embodiments, the external accessory knob may include one or more indentations to assist with the application of force, such as indentations 115 in FIG. 1 or indentations 515 in FIG. 5B. The position holding mechanism may include an energy storage device and a plurality of detents, such as shown in FIGS. 5A-5C. The position holding mechanism may slightly oppose movement of the external accessory knob and may provide for increased acceleration once the opposition to movement is overcome. In the examples shown in FIGS. 5A-5C, detents may include a ramp to increase acceleration of a mass in the position holding mechanism or external accessory knob. In some embodiments, the amount of mass may be increased to amplify the acceleration associated with the ramp.

At block 710, a motion tracking track device may be used to detect perturbation in at least one feedback parameter. The perturbation may be caused by the movement of the external accessory device when the external accessory device overcomes opposition by the position holding mechanism upon the application of force as described in block 708. The motion tracking device may include an accelerometer to measure linear acceleration on one or more axes, as described for FIG. 3. For example, the accelerometer may be used to provide at least one perturbed feedback parameter, such as a directional acceleration feedback parameter or a vector acceleration feedback parameter. In some embodiments, the motion tracking device may include a gyroscope to measure angular velocity on one or more axes, as described for FIG. 3. For example, the gyroscope may be used to provide at least one perturbed feedback parameter, such as a directional angular velocity feedback parameter or a vector angular velocity feedback parameter.

In this example, at block 712, the at least one perturbed feedback parameter may be received from the motion tracking device. For example, the electronic processor of the portable electronic device, as shown in FIG. 3, may receive the at least one perturbed feedback parameter. As another example, the motion processor of the motion tracking device, as shown in FIG. 3, may receive the at least one feedback parameter from an accelerometer, gyroscope, or coupled processor thereof.

At block 714, the at least one perturbed feedback parameter may be compared to the motion profile. The motion profile may be loaded as described in block 706. In this example, at block 716, it may be determined whether the at least one perturbed feedback parameter includes a vector direction and a linear direction. When the at least one perturbed feedback parameter includes a vector direction and a linear direction, method 700 may continue to block 718. Otherwise method 700 may continue to block 720. At block 718, the linear direction may be filtered from the vector direction. A processor of the portable electronic device, such as the electronic processor or motion processor shown in FIG. 3, may be used to perform the filtering, which may produce a filtered vector direction. In some embodiments, the linear direction may be associated with inertial movement, which may be provided by a gyroscope and may represent detection of movement over a period of time. For example, the linear direction may correspond to the opposing force of a user when moving the external accessory knob. In some embodiments, the vector direction may be associated with acceleration, which may be provided by an accelerometer and may represent detection of movement over a shorter period of time than the movement associated with the linear direction.

At block 720, a match between the at least one perturbed feedback parameter and at least one portion of the stored data defining the motion profile may be found. For example, a match may be found when the acceleration measured on one or more axes matches a known acceleration associated with a known perturbation of the external accessory knob, as provided by a portion of the stored data defining the motion profile. In some embodiments, the portion of the stored data may be an entry in a list. The entry may include the type of known perturbation, such as a perturbation caused by movement of the external accessory knob, and one or more parameters as described for block 706.

In various embodiments, a match may be found when the at least one perturbed feedback parameter, such as an acceleration measured on a plurality of axes, matches a known feedback parameter stored as a portion of the data defining the motion profile. In some embodiments, the known feedback parameter may be an acceleration associated with movement of the external accessory knob, such as a known acceleration associated with one or more perturbations 430a-430f, as shown in FIG. 4. In other embodiments, the known feedback parameter may fail to provide a match when an acceleration is associated with other movements of the portable electronic device. For example, the feedback parameter corresponding to a known acceleration on one or more axes that is associated with other movements of the portable electronic device may fail to provide a match. As another example, a feedback parameter corresponding to an acceleration on less than all axes of a known acceleration that is associated with movement of the portable electronic device may fail to provide a match. In some embodiments, the filtered vector direction as described for block 718 may be used to find a match.

At block 722, a characteristic of the movement of the external accessory knob may be identified based on finding a match as described for block 720. For example, the identified characteristic may be a rotational direction. In the examples shown in FIGS. 5A-5C, each of the detents may be located at a fixed radial position on the external accessory knob. A processor in the portable electronic device may be able to identify the position of the external accessory knob using information about the fixed radial position of the external accessory knob. In this example, the processor may identify a rotational direction of the movement associated with the external accessory knob.

At block 724, a setting on the portable electronic device may be increased or decreased in response to the identified characteristic. In some embodiments, the setting may be a configuration for the portable electronic device that supports a range of values, such as the frequency of a communications channel or the volume of a speaker. For example, the volume of the speaker for the portable electronic device may be increased when the identified characteristic corresponds to a clockwise rotational direction of movement associated with the external accessory knob. In this example, the volume of the speaker for the portable electronic device may be decreased when the identified characteristic corresponds to the counterclockwise rotational direction of movement associated with the external accessory knob. As another example, a communications channel may be changed, such as by changing the frequency of the communication channel, to synchronize communication between a transmitter and receiver. In this example, the channel of communication for the portable electronic device may be increased when the identified characteristic corresponds to the clockwise rotational direction of movement associated with the external accessory knob. It will be appreciated that other types of external accessory knobs may be used to increase, decrease, or change a setting on the portable electronic device.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A portable electronic device, comprising:
a housing comprising:
a processor;
a memory coupled to the processor, the memory operable to store data defining a motion profile; and
a motion tracking device coupled to the processor; and
an external accessory knob mounted to the housing, the external accessory knob comprising a position holding mechanism operable to oppose motion of the external accessory knob, wherein the position holding mechanism comprises a plurality of detents, each detent located at a fixed radial position on the external accessory knob;
the motion tracking device operable to detect perturbation in at least one feedback parameter perturbed by movement of the external accessory knob, the movement to overcome opposition by the position holding mechanism;
the processor operable to receive the perturbed feedback parameter and compare the perturbed feedback parameter to the motion profile to identify a characteristic of the movement of the external accessory knob by matching the perturbed feedback parameter with at least one portion of the stored data defining the motion profile associated with known perturbations, wherein:
the at least one perturbed feedback parameter comprising a vector direction and a linear direction, the vector direction comprising feedback in at least two directions; and
the comparison between the perturbed feedback parameter and the motion profile comprises filtering the linear direction from the vector direction.

2. The portable electronic device of claim 1, wherein the identified characteristic of the movement is a rotational direction of the movement associated with the filtered vector direction.

3. The portable electronic device of claim 1, wherein:
the housing further comprises a speaker; and
in response to the rotational direction of the movement associated with the filtered vector direction, the processor is operable to:
increase or decrease volume of the speaker; or
change a channel of communication for the portable electronic device.

4. The portable electronic device of claim 1, wherein the position holding mechanism comprises a ramp to increase acceleration of a mass when the movement of the external accessory knob overcomes the opposition by the position holding mechanism.

5. The portable electronic device of claim 1, wherein:
the housing is environmentally sealed from the external accessory knob; and
the motion tracking device detects the perturbation in the feedback parameter independent of any electrical coupling of the motion tracking device.

6. The portable electronic device of claim 1, wherein the motion tracking device comprises an accelerometer to measure acceleration on a plurality of axes, the at least one feedback parameter comprising a directional acceleration feedback parameter and a vector acceleration feedback parameter.

7. The portable electronic device of claim 1, wherein the external accessory knob is a rotary control and the movement of the external accessory knob overcomes the opposition by the position holding mechanism by rotation of the rotary control.

8. The portable electronic device of claim 1, wherein the external accessory knob is a slide control and movement of the external accessory knob overcomes opposition by the position holding mechanism by movement of the slide control.

9. A method of motion tracking for a portable electronic device, comprising:
detecting perturbation, with a motion tracking device, in at least one feedback parameter perturbed by movement of an external accessory knob, the movement to overcome opposition by a position holding mechanism of the external accessory knob mounted to a housing of the portable electronic device, wherein:
the perturbed feedback parameter comprises a vector direction and a linear direction, the vector direction comprising feedback in at least two directions; and
the position holding mechanism comprises a plurality of detents, each detent located at a fixed radial position on the external accessory knob;
comparing the perturbed feedback parameter to at least one portion of a predefined motion profile associated with known perturbations, wherein the comparison between the perturbed feedback parameter and the motion profile comprises filtering the linear direction from the vector direction;
finding a match between the perturbed feedback parameter and the at least one portion of the predefined motion profile; and
identifying a characteristic of the movement of the external accessory knob based on the match.

10. The method of claim 9, wherein the identified characteristic of the movement is a rotational direction of the movement associated with the filtered vector direction.

11. The method of claim 9, further comprising:
in response to the rotational direction of the movement associated with the filtered vector direction:
increasing or decreasing the volume of a speaker associated with the portable electronic device; or
changing a channel of communication for the portable electronic device.

12. The method of claim 9, wherein detecting perturbation in the feedback parameter perturbed by the movement to overcome opposition by a position holding mechanism comprises detecting acceleration of a mass increased by a ramp of the position holding mechanism.

13. The method of claim 9, wherein detecting perturbation in the feedback parameter is detected independent of any electrical coupling of the motion tracking device.

14. The method of claim 9, wherein detecting perturbation in the feedback parameter comprises measuring acceleration on a plurality of axes by an accelerometer of the motion tracking device, the at least one feedback parameter comprises a directional acceleration feedback parameter and a vector acceleration feedback parameter.

15. A control interface for a portable electronic device, comprising:
an external accessory knob mounted to an exterior surface of the portable electronic device, the external accessory knob comprising:
a position holding mechanism operable to oppose motion of the external accessory knob and produce perturbation by movement of the external accessory knob, wherein the position holding mechanism comprises a plurality of detents, each detent located at a fixed radial position on the external accessory knob;

the movement of the external accessory knob to overcome the opposition by the position holding mechanism;

the external accessory knob operable to transmit the perturbation to the portable electronic device in a vector direction and a linear direction; and the perturbation in the vector direction and the linear direction operable to be detected by a motion tracking device of the portable electronic device.

16. The control interface of claim 15, wherein:

the external accessory knob further comprises a hard stop operable to halt the movement of the external accessory knob beyond a position of the external accessory knob; and the movement of the external accessory knob is operable to free transmit the perturbation to the portable electronic device before the movement reaches the position of the external accessory knob associated with the hard stop.

17. The control interface of claim 15, wherein the position holding mechanism comprises a ramp to increase acceleration of a mass when the movement of the external accessory knob overcomes the opposition by the position holding mechanism.

18. The control interface of claim 15, wherein the external accessory knob is a rotary control and the movement of the external accessory knob overcomes the opposition by the position holding mechanism by rotation of the rotary control.

\* \* \* \* \*